US010421051B2

(12) United States Patent
Lüthge et al.

(10) Patent No.: US 10,421,051 B2
(45) Date of Patent: Sep. 24, 2019

(54) HYBRID DISPERSION AND USE THEREOF

(71) Applicant: Evonik Degussa GmbH, Essen (DE)

(72) Inventors: Thomas Lüthge, Consrade (DE); Maike Vivian Balbo Block, Hamburg (DE); Andy Beaman, Milton Keynes (GB); Gudrun Westphal, Neuhaus (DE); Christian Kluth, Wittenburg OT Lehsen (DE); Alfred Vuin, Essen (DE)

(73) Assignee: Evonik Degussa GmbH, Essen (DE)

( * ) Notice: Subject to any disclaimer, the term of this patent is extended or adjusted under 35 U.S.C. 154(b) by 421 days.

(21) Appl. No.: 15/327,091

(22) PCT Filed: Jul. 21, 2015

(86) PCT No.: PCT/EP2015/066607
§ 371 (c)(1),
(2) Date: Jan. 18, 2017

(87) PCT Pub. No.: WO2016/026639
PCT Pub. Date: Feb. 25, 2016

(65) Prior Publication Data
US 2017/0151542 A1    Jun. 1, 2017

(30) Foreign Application Priority Data

Aug. 19, 2014  (EP) .................................... 14181336

(51) Int. Cl.
| | | |
|---|---|---|
| *B01F 17/00* | (2006.01) | |
| *B29C 33/62* | (2006.01) | |
| *C09D 5/02* | (2006.01) | |
| *C09D 11/023* | (2014.01) | |
| *C09D 11/54* | (2014.01) | |

(52) U.S. Cl.
CPC ...... *B01F 17/0092* (2013.01); *B01F 17/0014* (2013.01); *B01F 17/0021* (2013.01); *B29C 33/62* (2013.01); *C09D 5/022* (2013.01); *C09D 11/54* (2013.01)

(58) Field of Classification Search
USPC ............................................ 106/31.25, 31.26
See application file for complete search history.

(56) References Cited

U.S. PATENT DOCUMENTS

| | | | |
|---|---|---|---|
| 2,834,748 A | 5/1958 | Bailey et al. | |
| 2,917,480 A | 12/1959 | Bailey et al. | |
| 3,629,308 A | 12/1971 | Bailey et al. | |
| 3,847,622 A * | 11/1974 | Brandl ................. | B01F 17/0021 106/10 |
| 3,933,695 A | 1/1976 | Omietanski et al. | |
| 4,042,540 A | 8/1977 | Lammerting et al. | |
| 4,147,847 A | 4/1979 | Schweiger et al. | |
| 4,308,063 A * | 12/1981 | Horiuchi ................. | B29C 33/62 106/38.22 |
| 4,427,803 A * | 1/1984 | Fukui ...................... | B29C 33/62 106/38.22 |
| 4,609,511 A | 9/1986 | Fischer et al. | |
| 4,855,379 A | 8/1989 | Budnik et al. | |
| 4,936,917 A * | 6/1990 | Harakal .................. | B29C 33/64 106/38.22 |
| 4,995,908 A * | 2/1991 | Buchwald ............... | B29C 33/62 106/311 |
| 5,100,697 A * | 3/1992 | Nielsen ................... | B28B 7/384 427/133 |
| 5,306,737 A | 4/1994 | Burkhart et al. | |
| 5,308,393 A | 5/1994 | Haettich et al. | |
| 5,357,018 A | 10/1994 | Burkhart et al. | |
| 5,601,774 A * | 2/1997 | Kohama ................. | B29C 33/62 264/331.19 |
| 5,844,010 A | 12/1998 | Burkhart et al. | |
| 6,162,290 A | 12/2000 | Schnieder et al. | |
| 6,527,842 B1 * | 3/2003 | Adams ............... | C09D 11/0235 106/31.25 |
| 7,671,103 B2 | 3/2010 | Eilbracht et al. | |
| 7,811,502 B2 | 10/2010 | Althoff et al. | |
| 8,173,058 B2 | 5/2012 | Henning | |
| 8,377,359 B2 | 2/2013 | Boinowitz et al. | |
| 8,748,514 B2 | 6/2014 | Althoff et al. | |
| 9,120,827 B2 | 9/2015 | Balbo Block et al. | |
| 9,879,132 B2 * | 1/2018 | Luthge ..................... | B29C 33/62 |
| 2003/0214078 A1 * | 11/2003 | Chikazawa ............. | B29C 33/62 264/338 |
| 2004/0194658 A1 * | 10/2004 | Konno ............... | C09D 11/0235 106/31.26 |
| 2006/0167125 A1 | 7/2006 | Bauer et al. | |
| 2007/0072951 A1 | 3/2007 | Bender et al. | |
| 2007/0108659 A1 | 5/2007 | Althoff et al. | |
| 2007/0132151 A1 | 6/2007 | Althoff et al. | |
| 2007/0282026 A1 | 12/2007 | Grigsby, Jr. et al. | |
| 2007/0283844 A1 | 12/2007 | Henning | |
| 2008/0047464 A1 | 2/2008 | Henning | |
| 2008/0234402 A1 | 9/2008 | Lehmann et al. | |
| 2008/0289532 A1 | 11/2008 | Henning et al. | |
| 2009/0020904 A1 | 1/2009 | Henning et al. | |

(Continued)

FOREIGN PATENT DOCUMENTS

| | | |
|---|---|---|
| DE | 2533074 A1 | 3/1976 |
| DE | 3842650 C1 | 6/1990 |
| DE | 4229402 A1 | 3/1994 |
| DE | 4239054 A1 | 5/1994 |
| DE | 4410710 A1 | 10/1995 |

(Continued)

OTHER PUBLICATIONS

English translation of the Written Opinion of the International Search Authority dated Oct. 16, 2015 for PCT/EP2015/066607; 5 pages.*

(Continued)

*Primary Examiner* — Helene Klemanski
(74) *Attorney, Agent, or Firm* — Philip P. McCann; Nexsen Pruet PLLC

(57) ABSTRACT

The invention relates to a dispersion comprising a dispersion medium (phase I) and a disperse liquid phase II, the dispersion being characterized in that both phases I and II comprise a further dispersed phase III and this dispersed phase III comprises a release-active agent; to a process for preparing the dispersion, and to the use as or for the production of paints, inks, polymer dispersions and release agents.

17 Claims, 2 Drawing Sheets

(56) References Cited

U.S. PATENT DOCUMENTS

Figure 1:
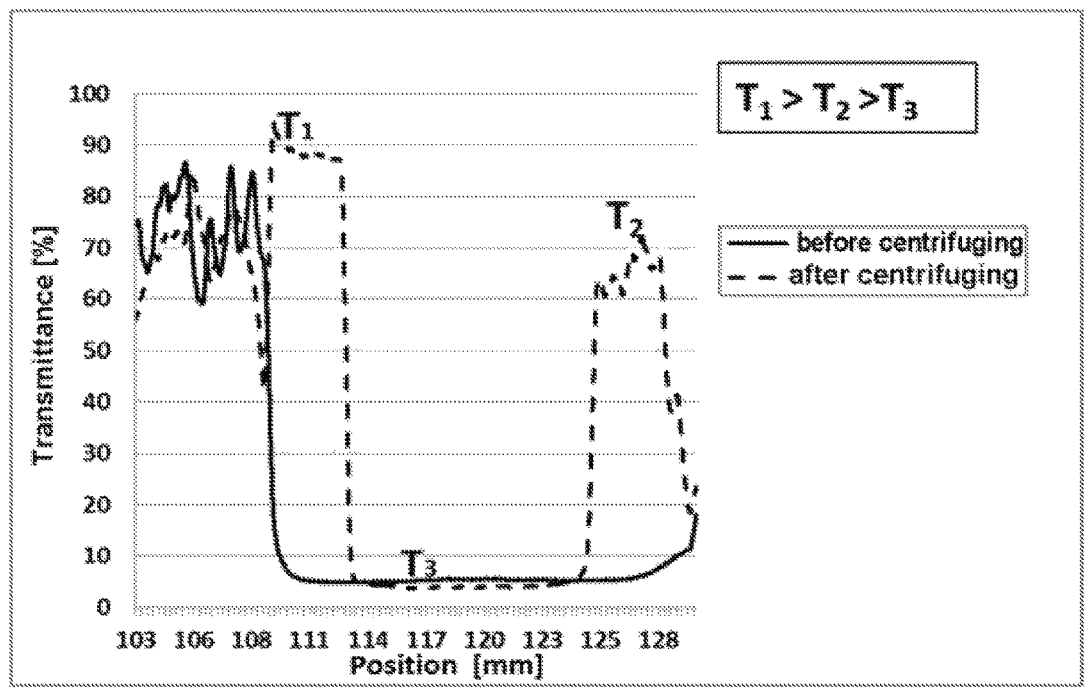

| | | | |
|---|---|---|---|
| 2009/0039544 A1 | 2/2009 | Henning et al. | |
| 2009/0088489 A1 | 4/2009 | Terheiden et al. | |
| 2011/0009532 A1 | 1/2011 | Luethge et al. | |
| 2017/0130038 A1* | 5/2017 | Luthge | B29C 33/62 |
| 2018/0016406 A1* | 1/2018 | Luthge | C09D 175/04 |

FOREIGN PATENT DOCUMENTS

| | | |
|---|---|---|
| DE | 19824279 C1 | 12/1999 |
| DE | 102004001408 A1 | 7/2005 |
| DE | 102005021059 A1 | 11/2006 |
| DE | 102005054033 A1 | 5/2007 |
| DE | 102005054034 A1 | 5/2007 |
| DE | 102005054036 A1 | 5/2007 |
| DE | 102005059142 A1 | 6/2007 |
| DE | 102006026870 A1 | 12/2007 |
| DE | 102006040009 A1 | 2/2008 |
| DE | 102007024493 A1 | 11/2008 |
| DE | 102007033430 A1 | 1/2009 |
| DE | 102007037571 A1 | 2/2009 |
| DE | 102007046860 A1 | 4/2009 |
| DE | 102009047764 A1 | 6/2011 |
| DE | 102010031376 A1 | 1/2012 |
| EP | 0164501 A2 | 12/1985 |
| EP | 0493836 A1 | 7/1992 |
| EP | 533202 A1 | 3/1993 |
| EP | 0780414 A2 | 6/1997 |
| EP | 0839852 A2 | 5/1998 |
| EP | 0656382 B1 | 8/1998 |
| EP | 867465 A1 | 9/1998 |
| EP | 1537159 A1 | 6/2005 |
| EP | 1544235 A1 | 6/2005 |
| EP | 1977825 A1 | 10/2008 |
| EP | 1985642 A1 | 10/2008 |
| EP | 1985644 A1 | 10/2008 |
| EP | 2017053 A1 | 1/2009 |
| JP | 10140069 A * | 5/1998 |
| WO | 2004020497 A1 | 3/2004 |
| WO | 2005118668 A1 | 12/2005 |
| WO | 2008139595 A1 | 11/2008 |
| WO | 2012007242 A1 | 1/2012 |
| WO | 2016026639 A1 | 2/2016 |
| WO | 2016139044 A1 | 9/2016 |

OTHER PUBLICATIONS

English translation of WO 2008/139595, Nov. 2008; 6 pages.*
English translation of JP 10/140069, May 1998; 13 pages.*
German language International Search Report dated Oct. 16, 2015 in PCT/EP2015/066607 (4 pages).
German language Written Opinion dated Oct. 16, 2015 in PCT/EP2015/066607 (5 pages).
International Search Report dated Oct. 16, 2015 in PCT/EP2015/066607 (3 pages).
Lüthge et al., U.S. Appl. No. 15/249,701, filed Aug. 29, 2016.

* cited by examiner

HYBRID DISPERSION AND USE THEREOF

This application is a national stage application under 35 U.S.C. § 371 of International Application No. PCT/EP2015/066607 filed 21 Jul. 2015, which claims priority to European Application No. 14181336.0 filed 19 Aug. 2014, the disclosures of which are expressly incorporated herein by reference.

FIELD

The invention relates to a dispersion comprising a dispersion medium (phase I) and a disperse liquid phase II, the dispersion being characterized in that at least one of the two phases, I or II, comprises a further dispersed phase III and this dispersed phase III comprise a release-active agent; to a process for preparing the dispersion; and to the use as or for the production of paints, inks, polymer dispersions and release agents.

BACKGROUND

There are numerous release agents known, especially for use in the production of polyurethane moldings.

DE 102005059142 A1 relates to release agent dispersions for the production of polyurethane moldings, comprising substantially at least one release-active agent from the group of soaps, oils, waxes and silicones, talc, a thickener and organic solvent.

DE 102005054036 A1 relates to aqueous dispersions comprising release-active agents, emulsifiers and customary auxiliaries and adjuvants, the release-active agent used being a combination of at least one release-active agent selected from the group of soaps, oils, waxes and silicones and talc.

DE 102005054034 A1 relates to aqueous dispersions comprising release-active agents, emulsifiers and customary auxiliaries and adjuvants, the release-active agent used being a combination of at least one release-active agent selected from the group of soaps, oils, waxes and silicones and polyester.

DE 102005054033 A1 relates to aqueous dispersions comprising release-active agents, emulsifiers and customary auxiliaries and adjuvants, the release-active agent used being a combination of at least one release-active agent selected from the group of soaps, oils, waxes and silicones and polyisobutylene.

DE 102005021059 A1 relates to a method for producing compact, cellulose-containing moldings by reaction of optionally modified organic polyisocyanates with cellulose, more particularly lignocellulose, in the presence of mold release agents in an open or closed molding tool, the mold release agents used being siloxane compounds containing aminopropyl groups.

DE 102006040009 A1 relates to aqueous release agent dispersions for the production of polyurethane moldings, comprising substantially: at least one release-active agent from the group of soaps, oils, waxes and silicones, and emulsifiers, and optionally foam stabilizers, and optionally viscosity modifiers, and optionally auxiliaries and adjuvants, and at least one bismuth carboxylate, and water.

DE 102006026870 A1 relates to release agent dispersions for the production of polyurethane moldings, comprising substantially at least one release-active agent from the group of soaps, oils, waxes and silicones, and at least one bismuth carboxylate, and organic solvent, and optionally customary auxiliaries and adjuvants.

DE 102007033430 A1 relates to a cutting oil comprising at least one polyalkylene glycol and optionally solvents and optionally further auxiliaries and adjuvants, and also to its use for the sawing of polyurethane foams.

DE 102007037571 A1 relates to aqueous release agent compositions which as release-active agents comprise at least one metal soap and at least one polyalkylene glycol.

EP 2017053 relates to release agents for the production of polyurethane moldings, comprising at least one release-active wax, at least one release-active oil and optionally further auxiliaries and adjuvants, with the proviso that the release agent has no water and no volatile organic solvents and that the release-active oil is substantially free from unsaturated hydrocarbons.

DE 102007024493 A1 relates to aqueous release agent dispersions for the production of polyurethane moldings, comprising substantially at least one release-active agent from the group of soaps, oils, waxes and silicones, and emulsifiers, and optionally foam stabilizers, and optionally viscosity modifiers, and optionally auxiliaries and adjuvants, and at least one alkali metal or alkaline earth metal carboxylate, and water.

DE 102009047764 A1 relates to release agent compositions which comprise as components at least one phosphate and at least one compound having at least two hydroxyl groups and a molecular weight of less than 250 g/mol, the fraction of component a) in the composition being from 0.1 to 70 wt % and the fraction of component b) from 0.5 to 90 wt %, and to a method for producing composite moldings in which these release agent compositions are used, to composite moldings obtainable accordingly, and to their use.

DE 102010031376 A1 relates to a method for producing compact, cellulose-containing moldings by reaction of optionally modified organic polyisocyanates with cellulose-containing material, more particularly lignocellulose-containing material, in the presence of mold release agents in an open or closed molding tool, where a mold release agent is used that comprises specific functionalized siloxane compounds containing alkyl or alkoxy groups, and comprises at least one phosphate and/or phosphoric ester, and to corresponding mold release agents and to the moldings obtainable with the method of the invention.

Transitioning from solvent-borne to purely water-based dispersions requires products with two immiscible solvents. To date it has been possible to prepare dispersions with two solvents only with specific solvent ratios, if one of the solvents contains no other dispersed ingredients. In the course of the preparation process, one dispersion has been prepared in a solvent, and then incorporated by dispersion into a second solvent. Dispersions of this kind are sold as release agents, for example, by Evonik Gorapur GmbH, under the type designation LK 8700-7BW, for example.

It was an object of the present invention to provide dispersions which are based on two immiscible solvents or solvent mixtures.

SUMMARY

Surprisingly it has been found that dispersions can be generated from two immiscible phases in a simple way if at least one release-active agent, more particularly a wax, and optionally further adjuvants, such as one or more emulsifiers, for example, have been dispersed in one or both phases before the mixing of said phases.

The present invention accordingly provides dispersions comprising a dispersion medium (phase I) and a disperse liquid phase II, these dispersions being characterized in that both phases I and II comprise a further dispersed phase III and this dispersed phase III comprises a release-active agent.

Likewise provided by the present invention are a process for preparing the dispersions and their use as or for the production of paints, inks, polymer dispersions and release agents.

The dispersions of the invention have the advantage that they can be used for the first time to provide dispersions which have two solvents or solvent mixtures which are immiscible with one another, in homogenous dispersion, with identical or different ingredients being present therein in solution and/or dispersion in each case.

The dispersions of the invention are more stable than conventional dispersions.

The dispersions of the invention, moreover, display advantages in application, since conventional dispersions with a high water content can be applied only with difficulty, such as using electrostatic spraying equipment, for example. Accordingly, the specific resistance of dispersions which are to be applied using electrostatic spraying equipment ought preferably not to be less than 5 Mohm/cm.

As a result of the high fraction that is possible of solvent phases with ingredients, especially release-active agents, preferably waxes, it is possible to obtain an improvement in film formation in the tool.

DETAILED DESCRIPTION

The dispersions of the invention and also their use are described by way of example below, without any intention that the invention should be confined to these exemplary embodiments. Where ranges, general formulae or classes of compound are specified below, they should be taken to include not only the corresponding ranges or groups of compounds that are explicitly mentioned, but also all sub-ranges and sub-groups of compounds that may be obtained by extraction of individual values (ranges) or compounds. Where documents are cited in the context of the present description, the intention is that the content of those documents, particularly in relation to the matters in connection with which the document has been cited, should belong completely to the disclosure content of the present invention. In the case of percentages, the figures involved, unless otherwise specified, are figures in weight percent. Where average values are indicated hereinafter, they are weight averages unless otherwise specified. Where parameters are specified hereinafter and have been determined by measurement, then the measurements, unless otherwise indicated, have been carried out at a temperature of 25° C. and a pressure of 101,325 Pa.

A feature of the dispersions of the invention comprising a dispersion medium (phase I) and a disperse liquid phase II is that both phases I and II comprise a further dispersed phase III and this dispersed phase III comprises a release-active agent. Where there is more than one dispersed phase III, such phases may have different release-active agents.

The two phases I and II at room temperature are preferably soluble in one another (i.e. miscible without formation of a phase boundary) to an extent of not more than 0.5 wt %, based on the respective other phase. The sum of the fractions of phases I and II (without phase(s) III) in the dispersion of the invention is preferably greater than or equal to 50 wt %, more preferably greater than or equal to 80 wt %, very preferably greater than or equal to 85 wt % and especially preferably greater than or equal to 90 wt %.

The mass ratio of phase I to phase II (excluding any phase(s) III present) in the dispersion of the invention is preferably from 1:100 to 100:1, more preferably from 1:5 to 5:1, very preferably 1:2 to 2:1 and especially preferably 1:1.2 to 1.2:1.

In the dispersion of the invention, phase II consists of water preferably to an extent of more than 55 wt %. Present in solution or dispersion in the water may be further substances, such as emulsifiers, spreading assistants, biocides and non-polar additives such as mineral oils, for example. The fraction of the substances dissolved in the water is preferably not more than 10 wt %, more preferably not more than 1 wt %, based on the sum of water and dissolved substances.

Phase I in the dispersions of the invention consists of a hydrocarbon or hydrocarbon mixture preferably to an extent of more than 75 wt %. Preferred hydrocarbons or hydrocarbon mixtures are those which have a flash point of 25 to 750° C., preferably 50 to 500° C., more preferably of 50 to 75° C. The hydrocarbons or hydrocarbon mixtures that are used in phase I must be present in liquid form at room temperature. Examples of hydrocarbons or hydrocarbon mixtures used with preference are petroleum fractions, especially those having a flash point of 50 to 500° C., preferably of 50 to 75° C. The flash point is determined preferably in accordance with the method described in DIN EN ISO 13736.

An advantageous feature of the dispersions of the invention is that both phases I and II comprise a dispersed phase III. The release-active agents of the two dispersed phases III may be the same or different. Preferably, release-active agents of the two dispersed phases III are different. Preferably both phases I and II comprise one or more microwaxes as release-active agent.

The fraction of release-active agents in the two phases I and II may be identical or different.

Where phase I has a dispersed phase III, the fraction of phase III in phase I is preferably from 0.1 to 20 wt %, more preferably from 1 to 7.5 wt %, based on the sum of phase I and phase III.

Where phase II has a dispersed phase III, the fraction of phase III in phase II is preferably from 1 to 40 wt %, more preferably from 5 to 20 wt %, based on the sum of phase II and phase III.

As release-active agent, the dispersion of the invention may comprise all common release-active agents. As release-active agent, the dispersion of the invention preferably comprises one or more waxes. Preferred waxes are those which have a solidification temperature of 25 to 250° C., preferably of 30 to 200° C. and more preferably of 40 to 150° C. The solidification temperature is determined preferably by dynamic scanning calorimetry in accordance with DIN EN ISO 11357-3. The determinations are made preferably using a DSC measuring station with peripherals, of type Q 1000 from TA Instruments, using aluminium standard boats from TA Instruments (order No. 900786.901) and a Sartorius M 3 P micro-analytical balance. The temperature programme has 2 heating phases and 1 cooling phase, which are set as follows: heating from 20-160° C. at 10 K/min, 2 min isothermally at 160° C., cooling from 160-20° C. at 10 K/min, 2 min isothermally at 20° C., and heating from 20-160° C. at 10 K/min. Of the homogenized sample, 10 mg±0.5 mg are weighed out into the standard aluminium boats and are melted on the hotplate. The boat is then sealed and must then remain at room temperature for at least 24 hours. A small hole is then punched in the lid of the boat, and the measurement is carried out with the stated temperature programme in accordance with the instrument instructions. In the evaluation of the plot, the solidification point is determined from the cooling plot. The solidification point reported is the extrapolated initial crystallization temperature $T_{eic}$.

Waxes used with preference are, for example, Fischer-Tropsch waxes, polyethylene waxes, especially unbranched polyethylene waxes, ethoxylated polyethylene waxes and microwaxes. Microwaxes (also called microcrystalline waxes) are waxes which are obtained, for example, from the vacuum residue from engine oil refining. This involves the removal of the heavy crude oil components through the application of a special refining procedure (http://de.wikipedia.org/wiki/Raffination) (e.g. propane deasphalting). The sequential procedure thereafter (deparaffinization, deoiling, refining) is analogous to that practiced on the other paraffins or waxes.

Where waxes used are polyethylene waxes, they preferably have a solidification temperature of 40 to 140° C., more preferably 50 to 120° C. Where waxes used are microwaxes, they preferably have a solidification temperature of 40 to 90° C., more preferably 60 to 80° C. Where waxes used are ethoxylated polyethylene waxes, they preferably have a solidification temperature of 40 to 140° C.

It can be advantageous for the dispersions of the invention to have more than one wax. The dispersions of the invention preferably have a microwax and at least one wax which is different from the microwax.

The fraction of the sum of release-active agents in the dispersion of the invention is preferably from 0.1 to 20 wt %, more preferably 1 to 15 wt % and very preferably 2 to 10 wt %, based on the overall composition of the dispersion. Where the dispersion includes more than one kind of release-active agents, preferably waxes, the fraction of the individual kinds is preferably from 0.05 to 10 wt %, more preferably 0.1 to 7.5 and very preferably 0.2 to 5.5 wt %, based on the overall composition of the dispersion.

Depending on their intended use, the dispersions may have further constituents. Where the dispersions of the invention are used as release agents in the production of polyurethane(foam)moldings, it may be advantageous for the dispersions to have one or more catalysts, one or more additives for influencing the foam properties and/or one or more foam stabilizers.

Preferred catalysts are substances which catalyse the gel reaction (isocyanate-polyol), the blowing reaction (isocyanate-water) or the dimerization or trimerization of the isocyanate. Typical examples are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethyl aminopropyl)hexahydro-1,3,5-triazine, dimethylaminoethanol, dimethylaminoethoxyethanol, and bis(dimethylaminoethyl) ether, and also metal-containing compounds such as, for example, tin compounds such as dibutyltin dilaurate, dioctyltin bis(2-ethylhexyl mercaptoacetate), dimethyltin dineodecanoate or tin(II) 2-ethylhexanoate, and potassium salts, such as potassium acetate and potassium 2-ethylhexanoate. Suitable catalysts are specified for example in DE 102007046860, EP 1985642, EP 1985644, EP 1977825, US 2008/0234402, EP 0656382 B1 and US 2007/0282026 and in the patent specifications cited therein. Instead of tin-containing catalysts it is also possible to use bismuth-containing catalysts. Particularly preferred bismuth-containing compounds are, for example, Bi(III) trisisononanoate, Bi(III) trisneodecanoate, Bi tris(2-ethylhexanoate) or Bi(III) trisoctoate.

The sum of the mass of the catalysts used is guided by the type of catalyst and is situated preferably in the range from 0.05 to 5 wt %, more preferably 0.1 to 2 wt %, based on the overall composition of the dispersion.

The foam properties of polyurethane foams may be influenced by adding additives to the dispersion of the invention. Such additives may in particular be siloxanes, or organically modified siloxanes, in which case the substances identified in the prior art can be used. Preference is given to using those compounds which are particularly suitable for the respective types of foam (rigid foams, hot-cure flexible foams, viscoelastic foams, ester-type foams, HR foams, semi-rigid foams). Suitable (organically modified) siloxanes are described for example in the following specifications: EP 0839852, EP 1544235, DE 10 2004 001 408, EP 0839852, WO 2005/118668, US 20070072951, DE 2533074, EP 1537159 EP 533202, U.S. Pat. No. 3,933,695, EP 0780414, DE 4239054, DE 4229402, EP 867465. These compounds may be prepared as described in the prior art. Suitable examples are described for instance in U.S. Pat. No. 4,147,847, EP 0493836 and U.S. Pat. No. 4,855,379.

(Foam)stabilizers used may be all of the stabilizers known from the prior art. Preference is given to using foam stabilizers based on polydialkylsiloxane-polyoxyalkylene copolymers, of the type generally used in producing foamed urethane materials. The construction of these compounds is preferably such that, for example, a long-chain copolymer of ethylene oxide and propylene oxide is joined to a polydimethylsiloxane radical. The link between the polydialkylsiloxane and the polyether portion may be via an SiC link or via an Si—O—C bond. In structural terms, the polyether or the various polyethers may be attached to the polydialkylsiloxane terminally or laterally. The alkyl radical or the various alkyl radicals here may be aliphatic, cycloaliphatic or aromatic. Methyl groups are especially advantageous here. The polydialkylsiloxane here may be linear or else contain branching. Suitable stabilizers, especially foam stabilizers, are described in references including U.S. Pat. Nos. 2,834,748, 2,917,480 and 3,629,308. Suitable stabilizers may be acquired from Evonik Industries AG under the trade name TEGOSTAB® or from Air Products under the DC® designation.

The sum of the mass of additives and foam stabilizers used is guided by the type of polyurethane(foam)molding to be produced, and is situated preferably in the range from 0.05 to 5 wt %, more preferably 0.1 to 2.5 wt %, based on the overall composition of the dispersion.

Particularly preferred dispersions of the invention are those in which the fraction of the sum of phases I and II (without phase(s) III) in the dispersion is preferably greater than or equal to 50 wt %, more preferably greater than or equal to 80 wt %, very preferably greater than or equal to 85 wt % and especially preferably greater than or equal to 90 wt %, phase II preferably is or comprises water, and phase I preferably is or comprises a hydrocarbon or a hydrocarbon mixture, the release-active agents are waxes, have a solidification temperature of 25 to 250° C., preferably of 30 to 200° C. and more preferably of 40 to 150° C., and are selected from polyethylene waxes, ethoxylated polyethylene waxes and microwaxes, the fraction of the sum of waxes in the dispersion of the invention is preferably from 0.1 to 20 wt %, more preferably 1 to 15 wt % and very preferably 2 to 10 wt %, based on the overall composition of the dispersion, and, if there is more than one kind of wax in the dispersion, the fraction of the individual kinds of wax is preferably from 0.05 to 10 wt %, more preferably 0.1 to 7.5 and very preferably 0.2 to 5.5 wt %, based on the overall composition of the dispersion. It may be advantageous if these particularly preferred dispersions of the invention comprise one or more catalysts selected from triethylamine, dimethylcyclohexyl amine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol, bis(dimethylaminoethyl) ether, dibutyltin dilaurate, tin(II) 2-ethylhexanoate, potassium acetate and potassium 2-ethylhexanoate, the sum of the mass of the catalysts used being in the range from 0.05 to 5 wt %, preferably 0.1 to 2 wt %, based on the overall composition of the dispersion, and comprise one or more additives selected from siloxanes or organically modified siloxanes, for the purpose of influencing the foam properties, and/or comprise one or more polydialkylsiloxane-polyoxyalkylene copolymers as foam stabilizers, the sum of the mass of the additives and foam stabilizers used being preferably in the range from 0.05 to 5 wt %, more preferably 0.1 to 2.5 wt %, based on the overall composition of the dispersion.

The process of the invention for preparing a dispersion of the invention is distinguished by the fact that a phase I and a phase II are provided, a release-active agent as phase III is dispersed into both of phases I and II, and subsequently phases I and II are mixed with one another. Preference is given to using phases I and II which are soluble in one another at room temperature to an extent of not more than 0.5 wt %, based on the respective other phase. Phases I and II used with preference are those as described above.

Agents used as release-active agent in the process of the invention are preferably waxes, more particularly the waxes described above. One or more molten waxes are used with particular preference as release-active agents.

The release-active agents dispersed in as phase III may be the same or different; preferably the release-active agents are different. The amount of release-active agents incorporated by dispersion is selected such as to give dispersions having the above-indicated preferred fractions of release-active agents.

The constituents, particularly the release-active agents, and/or the process conditions for the preparation of the phase I and/or II in which the phase III is dispersed are preferably selected in each case such that the phase I and/or II in which the phase III is dispersed are stable per se. Stable in the context of the present invention means that there is no formation of a macroscopic phase boundary (phase boundary visible to the naked eye) within the first 24 hours after preparation.

The mixing of phases I and II, preferably in the proportions indicated above, may be accomplished in a wide variety of ways—for example, by intensive stirring of the dispersions which have been introduced into a container, or by the combining and mixing of the two dispersions in an inliner or the like.

The dispersions of the invention may be used as paints, inks, polymer dispersions and release agents, or for production of paints, inks, polymer dispersions and release agents. Preference is given to the use of the dispersions as release agents, more preferably as release agents in the production of polyurethane(foam)moldings, shaped rubber parts, shaped composite parts, shaped metal pressure casting parts, glasses, concrete or foods, very preferably as release agents in the production of polyurethane(foam)moldings. Where the dispersion of the invention is used as a release agent in the production of polyurethane(foam)moldings, the dispersion of the invention is used preferably as an external release agent, thus being put into the mold ahead of the actual shaping operation. Application of the dispersion to the surface of the mold is accomplished preferably by spraying.

The dispersions of the invention preferably have a characteristic separation behaviour which can be determined by means of stability analysis using the LUMiFuge® stability analyser from LUM GmbH, with an optical unit having the following parameters:

Principle of measurement: photometric

Light source: pulsed NIR-LED, 870 nm

Light intensity range: 0.25 to 6

Detector: CCD-Line, 2048 elements

Perforated detector mask: 14 m

Detection length: 25 mm

Absorbance range: 0.1-4.0

Cuvette width: 4.5 mm.

For this purpose, samples of the dispersion under investigation are diluted with water in a mass ratio of 1:1, and these diluted samples are briefly stirred and finally analysed in the stability analyser at a measurement temperature of 25° C. in accordance with the operating instructions (1 h at 3500 rpm) and evaluated using the SEPView® software (Version SEPView6) from LUM GmbH.

The dispersions of the invention exhibit at least 3 phases following separation by centrifuging, these phases being discernible as phases having different transmittances (T):

An upper phase 1; this phase is preferably transparent to slightly hazy ($T_1$). Beneath it is a non-translucent phase 3 with the lowest transmittance ($T_3$), in which it may be possible in turn to see a phase boundary ($T_{3a}$) and ($T_{3b}$); the transmittance of both sub-phases of phase 3 may be similar. Located beneath the phase or phases 3 is phase 2 which in comparison to phase 3 has a higher transmittance ($T_2$). The transmittance of phases 1 and 2 may be the same or different, but in each case it is substantially higher than the transmittance of phase 3. Dispersions of the invention therefore preferably exhibit a separation behaviour, as determined by LUMiFuge® from LUM GmbH (1 h at 3500 rpm), in which the following relation is true for the transmittance of phases 1 to 3: $T_1 \geq T_2 > T_{3,a}, T_{3,b}$.

In contrast, non-inventive dispersions, using the same analysis method, exhibit a different separation behaviour. Separating out as the upper phase is the phase with the lowest transmittance ($T_i$). Beneath this are one or two phases which exhibit a higher transmittance than phase i ($T_{ii}$; $T_{iii}$), so that the relationship for non-inventive dispersions is preferably as follows: $T_i < T_{ii} \leq T_{iii}$.

Figure 2:
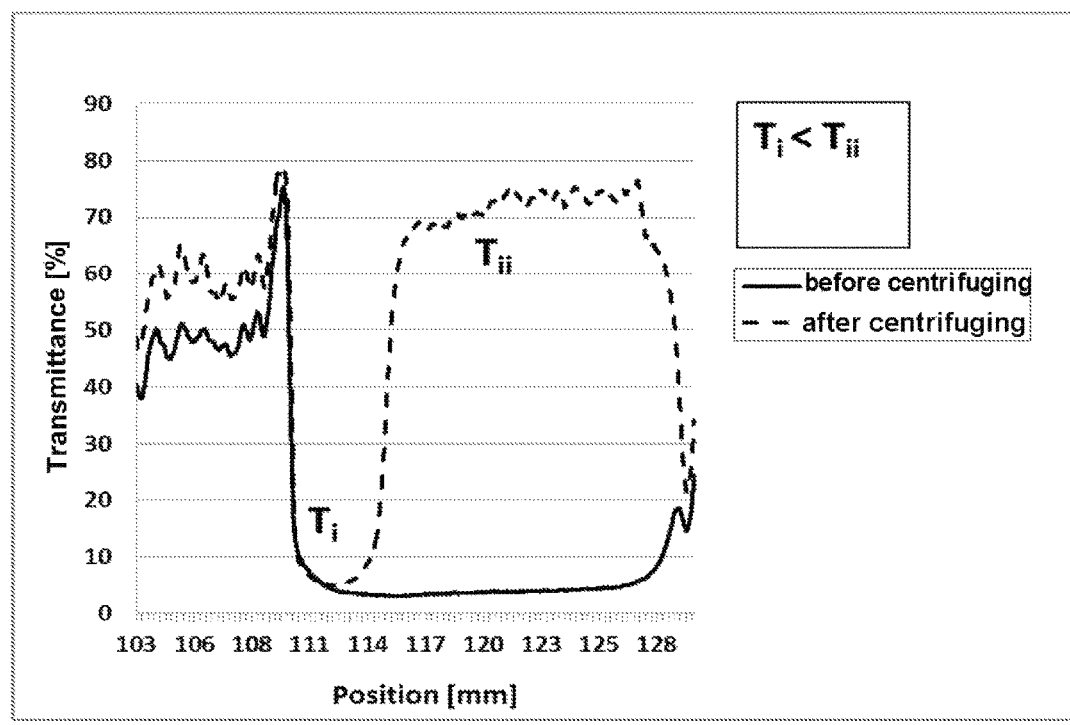

The present invention is elucidated in more detail by FIGS. 1 and 2, without any intention that the invention should be confined to these figures. FIG. 1 shows the transmission behaviour of a sample of the inventive dispersion as per Example 1c, separated according to Example 6. The position in the measuring cuvette in mm is shown on the x-axis, while the y-axis indicates the transmittance in %. FIG. 2 reproduces the transmission behaviour of a non-inventive dispersion as per Example 1d.

In the examples set out below, the present invention is described by way of example, without any intention that the invention—whose breadth of application results from the entire description and from the claims—should be confined to the embodiments specified in the examples.

EXAMPLES

List of substances used:
Polyethylene wax=wax from Evonik Industries AG with a solidification temperature of 60° C.
Hydrocarbons=petroleum fraction from Shell with a flash point of 56° C.
Cosmos 19=dibutyltin dilaurate (DBTL); manufacturer: Evonik Industries AG
Microwax=Microwax HEI from Paramelt, with a solidification temperature of 70° C.
Tegostab® B8443=polyethersiloxane, manufacturer: Evonik Industries AG
Marlipal 1618/11, manufacturer: Sasol Olefin & Surfactants GmbH
Genamin 16R; manufacturer: TerHell
Acetic acid, supplier: Brenntag
Desmophen® PU 50REII=polyether polyol, manufacturer: Bayer
Tegoamin® TA 33, manufacturer: Evonik Industries AG
Diethanolamine, manufacturer: Bayer MaterialScience
Tegostab® B4113, manufacturer: Evonik Industries AG
Suprasec® X 2412, manufacturer: Huntsman
List of apparatus used:
Stirring was carried out using the RW 20 digital agitator from IKA, with a two-blade paddle stirrer.
The rotor-stator dispersing assembly utilized was a T50 digital Ultra-Turrax with an S 50 N-G 45 G dispersing tool.
The bead mill used was a DISPERMAT® SL from VMA-GETZMANN GMBH.
The high-pressure homogenizer used was the 2000/04-SH5 from IKA.
For the rundown tests, steel plates of type R 64 Q-Panel from Q-Lab were utilized.

Example 1: Preparation of the (Release Agent) Dispersions

Example 1a: Non-Inventive Release Agent 2.5 parts by weight of polyethylene wax (solidification point 60° C.) and 2.5 parts by weight of microwax (solidification point 70° C.) are melted and admixed with 45 parts by weight of hydrocarbon (flash point 56° C.). 48.5 parts by weight of hydrocarbon (flash point 56° C.) are admixed with 0.5 part by weight of dibutyltin dilaurate and 1 part by weight of Tegostab® B 8443 and added to the wax dispersion.

Example 1b: Non-Inventive Release Agent 2.5 parts by weight of polyethylene wax (solidification point 60° C.) and 2.5 parts by weight of microwax (solidification point 70° C.) are melted and admixed with 5 parts by weight of ethoxylated polyethylene wax, 0.9 part by weight of Genamin 16R and 0.2 part by weight of acetic acid. Subsequently the melt is added at 90° C. to 88.9 parts by weight of water, followed by intensive stirring.

Example 1c: Inventive Release Agent 50 wt % of the release agent from Example 1a and 50 wt % of the release agent from Example 1b were placed in a glass beaker and stirred intensively at room temperature for 20 minutes.

Example 1d: Non-Inventive Release Agent 2.5 parts by weight of polyethylene wax (solidification point 60° C.) and 2.5 parts by weight of microwax (solidification point 70° C.) are melted and admixed with 15 parts by weight of hydrocarbon (flash point 56° C.). Then 0.9 part by weight of Genamin is added and the mixture is subsequently introduced into 78.5 parts by weight of water, followed by intensive stirring. Lastly, 0.5 part by weight of dibutyltin dilaurate and 1 part by weight of Tegostab® B 8443 are incorporated into the dispersion with stirring.

Example 1e: Non-Inventive Release Agent 2.5 parts by weight of polyethylene wax (solidification point 60° C.) and 2.5 parts by weight of microwax (solidification point 70° C.) are melted and admixed with 35 parts by weight of hydrocarbon (flash point 56° C.). Then 0.9 part by weight of Genamin is added and the mixture is subsequently introduced into 58.5 parts by weight of water, followed by intensive stirring. Lastly, 0.5 part by weight of dibutyltin dilaurate and 1 part by weight of Tegostab® B 8443 are incorporated into the dispersion with stirring.

Example 1f: Non-Inventive Release Agent 2.5 parts by weight of polyethylene wax (solidification point 60° C.) and 2.5 parts by weight of microwax (solidification point 70° C.) are melted and admixed with 55 parts by weight of hydrocarbon (flash point 56° C.). Then 0.9 part by weight of Genamin is added and the mixture is subsequently introduced into 38.5 parts by weight of water, followed by intensive stirring. Lastly, 0.5 part by weight of dibutyltin dilaurate and 1 part by weight of Tegostab® B 8443 are incorporated into the dispersion with stirring.

Example 1g: Inventive Release Agent 50 wt % of the release agent from Example 1a and 50 wt % of the release agent from Example 1b were placed into a glass beaker and dispersed intensively at room temperature for 30 minutes using an Ultra-Turrax at 5000 revolutions/min.

Example 1h: Inventive Release Agent 50 wt % of the release agent from Example 1a and 50 wt % of the release agent from Example 1b were dispersed intensively at room temperature for 45 minutes in a bead mill (rotor-split tube separating apparatus, zirconium beads 2 micrometers).

Example 1i: Inventive Release Agent 50 wt % of the release agent from Example 1a and 50 wt % of the release agent from Example 1b were dispersed intensively at room temperature for 45 minutes using a high-pressure homogenizer (1000 bar, 20 l/h).

Example 1j: Inventive Release Agent 30 wt % of the release agent from Example 1a and 70 wt % of the release agent from Example 1b were dispersed intensively at room temperature for 45 minutes with an agitator with two-blade paddle stirrer.

Example 1k: Inventive Release Agent 70 wt % of the release agent from Example 1a and 30 wt % of the release agent from Example 1b were dispersed intensively at room temperature for 45 minutes with an agitator with two-blade paddle stirrer.

Example 2: Release Experiments

The release agents of Examples 1a, 1b and 1c were applied in amounts of 30 g/m² to metal plates, using a nozzle. Thereafter a polyurethane system consisting of 100 parts by weight of Desmophen® PU 50REII, 3.5 parts by weight of water, 0.5 part by weight of Tegoamin® 33, 1.5 parts by weight of diethanolamine, 1 part by weight of Tegostab® B4113, and 78 parts by weight of Suprasec® X 2412 was foamed at 55° C. in a box mold formed from the plates, the box mold being covered with a metal plate sprayed with release agent, and assessments being made of the release force and the foam surface after the end of foam formation. The results are reported in Table 1.

TABLE 1

Evaluation of release agent experiments

| Release agent | Force for removing the metal plate from the foam [Kg] | Assessment of foam surface |
|---|---|---|
| 1a | 1.5 | very uneven, in part greatly open-pored |
| 1b | 1.8 | very uneven, in part greatly open-pored |
| 1c | 0.3 | very even, only minimally open-pored |

Example 3: Dispersion Stability

The dispersion stability was appraised visually. For this purpose, the samples were checked daily and compared with freshly produced samples. The results are listed in Table 2.

TABLE 2 evaluation of dispersion stability:

| Release agent | Separation at room temperature beginning visibly after |
|---|---|
| 1a | >20 days |
| 1b | >10 days |
| 1c | >50 days |
| 1d | 5 days |
| 1e | 2 days |
| 1f | 1 day |
| 1g | >50 days |
| 1h | >50 days |
| 1i | >50 days |
| 1j | >50 days |
| 1k | >50 days |

Example 4: Electrical Conductivity of the Dispersions

The specific resistance of the dispersions was measured using a Voltcraft 96 from METEX. For this purpose, the measuring head of the instrument was immersed at room temperature into the dispersion until it was possible to read off a constant measurement value. The results are reproduced in Table 3.

TABLE 3

Conductivity of the dispersions:

| Release agent | Specific resistance [Mohm/cm] |
|---|---|
| 1a | >5 |
| 1b | 0.03 |
| 1c | >5 |
| 1d | 0.02 |
| 1e | 0.01 |
| 1f | 0.01 |
| 1g | >5 |
| 1h | >5 |
| 1i | >5 |
| 1j | 0.01 |
| 1k | >5 |

Example 5: Film-Forming of the Dispersions

The film-forming of the dispersions was determined by measuring the length of the rundown of 0.5 ml of dispersion on a metal plate heated at 60° C. For this purpose, the metal plate was positioned at an angle of 45°. The length of the run was measured after the solvent had dried off. The results are reported in Table 4.

TABLE 4

Rundown lengths determined

| Release agent | Length of rundown in cm |
|---|---|
| 1a | 5.1 |
| 1b | 2.3 |
| 1c | 5.3 |
| 1d | 2.5 |
| 1e | 2.2 |
| 1f | 2.4 |
| 1g | 2.3 |
| 1h | 2.2 |
| 1i | 2.3 |
| 1j | 2.5 |
| 1k | 2.2 |

Example 6: Separation Behaviour After Centrifuging

For the stability analysis, the LUMiFuge® stability analyser from LUM GmbH was used, and was operated with the parameters described above in the description. Samples analysed were those of the inventive dispersion of Example 1c and of the non-inventive dispersion 1d.

Analysis of the inventive dispersion from Example 1c resulted, after separation by centrifuging, in at least 3 phases, which were discernible as phases with different transmittances (T):

Separating out as the upper phase was phase 1. This phase is transparent to slightly hazy ($T_1$). Beneath it was the non-translucent phase 3 with the lowest transmittance ($T_3$). Within phase 3 in turn a phase boundary was visible. The transmittances of the two sub-phases of phase 3 are similar. Below this, down to the base of the container, was phase 2, which had a higher transmittance ($T_2$) by comparison with phase 3.

The transmittances of phase 1 and 2 were virtually identical, and in each case the transmittance was substantially higher than that of phase 3, having the following relationship: $T_1 \geq T_2 > T_{3,a}, T_{3,b}$.

Analysis of the non-inventive dispersion from Example 1d gave, after separation by centrifuging, the deposition of an upper phase having the lowest transmittance ($T_i$). Located immediately beneath it was a phase which showed a higher transmittance than phase i ($T_{ii}$), and so the relationship was as follows: $T_i<T_{ii}$.

The invention claimed is:

1. A dispersion comprising a dispersion medium (phase I) and a disperse liquid phase II, wherein both phases I and II comprise a further dispersed phase III and this dispersed phase III comprises a release-active agent, wherein phase III has a fraction in phase II of from 5 to 20 wt %, based on the sum of phase II and phase III, wherein the dispersion has 3 phases following separation by centrifuging, these phases being discernible as phases having different transmittances (T).

2. The dispersion according to claim 1, wherein the two phases I and II at room temperature are soluble in one another to an extent of not more than 0.5 wt %, based on the respective other phase.

3. The dispersion according to claim 1, wherein phase I and phase II have mass and phase I to phase II have a mass ratio of from 0.1:100 to 100:0.1.

4. The dispersion according to claim 1, wherein phase II consists of water to an extent of more than 55 wt %.

5. The dispersion according to claim 1, wherein phase I consists of a hydrocarbon or hydrocarbon mixture to an extent of more than 75 wt %.

6. The dispersion according to claim 1, wherein phase III has a fraction in phase I of from 0.1 to 20 wt %, based on the sum of phase I and phase III.

7. The dispersion according to claim 1, wherein said release-active agent in phase III comprises one or more microwaxes, polyethylene waxes and/or ethoxylated polyethylene waxes.

8. A process for preparing a dispersion according to claim 1, wherein a phase I and a phase II are provided, a release-active agent is dispersed as phase III into both of phases I and II, and subsequently phases I and II are mixed with one another.

9. The process according to claim 8, wherein the two phases I and II at room temperature are soluble in one another to an extent of not more than 0.5 wt %, based on the respective other phase.

10. The process according to claim 8, wherein a molten wax is used as release-active agent.

11. A product comprising the dispersion according to claim 1 wherein the product is selected from the group consisting of paints, inks, polymer dispersions and release agents.

12. The dispersion according to claim 2, wherein phase I and phase II have mass and phase I to phase II have a mass ratio of from 0.1:100 to 100:0.1.

13. The dispersion according to claim 2, wherein phase II consists of water to an extent of more than 55 wt %.

14. The dispersion according to claim 2, wherein phase I consists of a hydrocarbon or hydrocarbon mixture to an extent of more than 75 wt %.

15. The dispersion according to claim 1, wherein phase III has a fraction in phase I of from 1 to 7.5 wt %, based on the sum of phase I and phase III.

16. The dispersion according to claim 2, wherein phase III has a fraction in phase I of from 1 to 7.5 wt %, based on the sum of phase I and phase III.

17. The dispersion according to claim 1, wherein said release-active agent in phase III comprises one or more microwaxes and/or ethoxylated polyethylene waxes.

* * * * *